United States Patent [19]

Hofmann et al.

[11] Patent Number: 4,768,856
[45] Date of Patent: Sep. 6, 1988

[54] OPTICAL-WAVEGUIDE COIL AND METHOD OF MAKING SAME

[75] Inventors: Werner Hofmann, Ingersheim; Friedemann Mohr, Renningen; Leo Bräutigam, Ostfildern; Heinz Mieskes, Bietigheim, all of Fed. Rep. of Germany

[73] Assignee: Standard Elektrik Lorenz A.G., Fed. Rep. of Germany

[21] Appl. No.: 7,834

[22] Filed: Jan. 27, 1987

[30] Foreign Application Priority Data

Jan. 29, 1986 [DE] Fed. Rep. of Germany ....... 3602584

[51] Int. Cl.$^4$ .................. G02B 6/44; H01F 27/30; H01F 7/06
[52] U.S. Cl. .................. 350/96.23; 350/96.10; 350/96.20; 350/96.22; 350/96.24; 350/320; 336/199; 336/205; 336/206; 336/208; 29/605; 29/606
[58] Field of Search ............ 350/96.10, 96.15, 96.20, 350/96.22, 96.23, 96.24, 96.29, 96.30, 320; 250/227; 356/350; 336/199, 205, 206, 207, 208; 29/605, 606

[56] References Cited

U.S. PATENT DOCUMENTS

| 3,462,544 | 8/1969 | King | 336/205 |
|---|---|---|---|
| 3,487,347 | 12/1969 | Lepianka | 336/206 |
| 4,173,747 | 11/1979 | Grimes et al. | 336/206 X |
| 4,442,350 | 4/1984 | Rashleigh | 250/227 |
| 4,534,222 | 8/1985 | Finch et al. | 250/227 X |
| 4,613,752 | 9/1986 | Davis | 350/96.15 X |
| 4,699,451 | 10/1987 | Mohr | 350/96.15 |
| 4,724,316 | 2/1988 | Morton | 350/96.29 X |

FOREIGN PATENT DOCUMENTS

| 3152704 | 4/1983 | Fed. Rep. of Germany | 356/350 |
|---|---|---|---|
| 3332718 | 3/1985 | Fed. Rep. of Germany | 350/96.23 |
| 2496280 | 6/1982 | France | 350/96.20 |
| 54-138452 | 10/1979 | Japan | 350/96.23 |
| 2128815 | 5/1984 | United Kingdom | 336/206 X |
| 2161028 | 1/1986 | United Kingdom | 336/206 X |

OTHER PUBLICATIONS

Servais, "Silastic—The Heat Stable Silicone Rubber", Rubber Age, vol. 58, No. 5, 2/46 pp. 579–584.

Primary Examiner—William L. Sikes
Assistant Examiner—Brian M. Healy
Attorney, Agent, or Firm—Peter C. Van Der Sluys

[57] ABSTRACT

Optical-waveguide coils are used in rotation rate measuring instruments. To protect the optical-waveguide coil (1) from external influences, such as sound waves, pressure, and temperature changes, which may result in measurement errors, it is wound on a coil form (2) of soft elastomer under low tension. The coil unit so formed (1/2) is then placed in the annular groove (4) of a housing (3/5). Spacers at the coil form (2) position the coil unit (1/2) in the annular groove in such a way that the coil (1) is exactly in the middle of the annular groove (4). The remaining free space of the annular groove (4) is then filled with a sealing compound (6) in a vacuum. The sealing compound also spreads between the windings of the coil (1). It is preferably the same material as that from which the coil form (2) is made.

6 Claims, 1 Drawing Sheet

OPTICAL-WAVEGUIDE COIL AND METHOD OF MAKING SAME

BACKGROUND OF THE INVENTION

The present invention relates to an optical-waveguide coil in a housing.

Optical-waveguide coils with and without a housing are disclosed in German Patent Application No. P 31 52 704.3 and DE-OS No. 33 32 718.1. In both designs, the optical-waveguides are embedded in a sealing compound.

SUMMARY OF THE INVENTION

The object of the present invention is to provide an optical-waveguide coil which is easy to manufacture.

This object is attained by the features set forth in claim 1. Further advantageous features of the subject matter of the invention are claimed in subclaims 2 to 5. The method of making the optical-waveguide coil is claimed in claim 7.

The principal advantages offered by the invention are that the optical-waveguide coil, by being totally enclosed by an elastomer, is largely protected against shock, sound-pressure, and temperature influences acting on the housing from outside, that temperature changes occurring at one side of the housing are compensated for by the thermal short-circuit within the housing, that the winding of the coil on a coil form permits simple manufacture, that, as a result of the temporary expansion of the elastic coil form, the layers of the coil are virtually free of tension at the time of embedment, and that the spacers of the coil form ensure in a simple manner that the optical-waveguide coil is positioned in the middle of the annular groove of the housing.

BRIEF DESCRIPTION OF THE DRAWINGS

An embodiment of the invention will now be explained with reference to the accompanying drawing, in which.

DETAILED DESCRIPTION OF THE INVENTION

Figure 1:
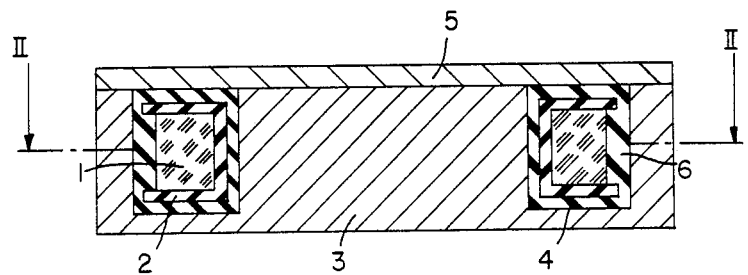
FIG. 1 is a vertical section through an optical-waveguide coil in a housing in accordance with the invention.
Figure 2:
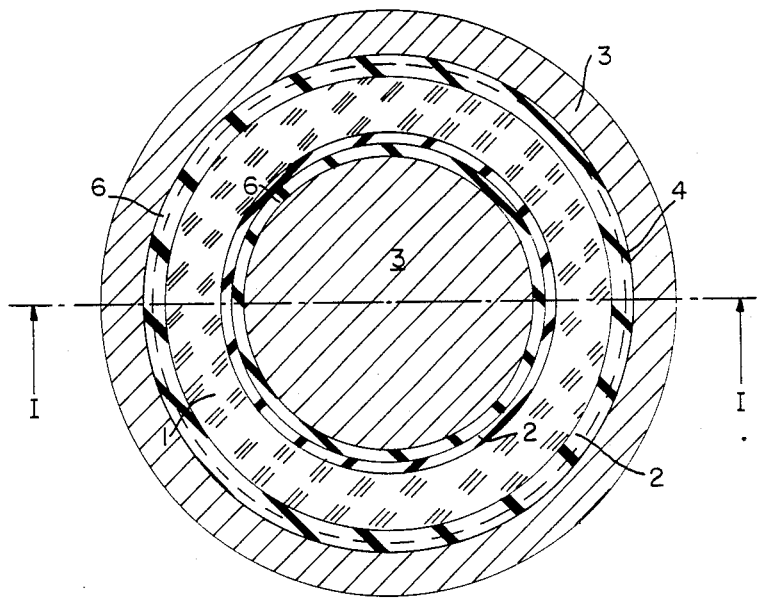
FIG. 2 is a horizontal section through the coil of FIG. 1.

As can be seen from the figures, the housing for the optical-waveguide coil consists of a solid lower part 3, which has a concentric annular groove 4, and a cover 5. It is made of a material of high thermal conductivity. This can be metal or a plastic containing inorganic thermally conductive fillers. The cross section of the annular groove 4 is larger than that of a coil unit 1/2. The latter consists of a coil form 2, which is made of an elastomer of low hardness, and the optical-waveguide coil 1 wound thereon. The coil unit 1/2 is a little smaller than the annular groove 4. Spacers (not shown) at the coil form 2 position the coil unit 1/2 in the annular groove 4 in such a way that the optical-waveguide coil 1 is located exactly in the middle of the annular groove 4, as can be seen in FIG. 1. To secure the coil unit 1/2 in this position and attenuate external influences on the housing 3/5, the coil unit 1/2 in the annular groove 4 is embedded in a sealing compound 6, preferably the same elastomer as that of the coil form 2 or an elastomer similar thereto.

In the following, the manufacture of the optical-waveguide coil 1 and the embedment of the coil unit 1/2 will be described.

The elastic coil form 2 is slipped over a winding mandrel and, at the same time, slightly expanded. The optical waveguide is then wound on the coil form 2 under very low tension, so that a relatively loose, substantially tension-free coil 1 is obtained. When being removed from the mandrel, the coil form 2 returns to its original shape. As the inside diameter of the coil form 2 decreases by the amount of expansion, there is some clearance between the coil 1 and the coil form 2, so that any tension inside the coil 1 can relax toward the center. The coil unit 1/2 thus obtained is then placed in the annular groove 4 of the lower part 3 of the housing. The spacers (not shown) at the coil form 2 position the coil unit 1/2 in the annular groove 4 in such a way that the optical-waveguide coil 1 is spaced the same distance from all areas enclosing the coil. To obtain optimum heat transfer between the lower part 3 of the housing and the cover 5, the lower part 3 and the cover 5, in addition to being held together by, e.g., screws, are joined together with a thermally conductive adhesive. Through openings (not shown), the remaining free space of the annular groove 4 is then filled with the sealing compound 6 in a vacuum. The sealing compound 6 also spreads between the windings of the coil 1, embeds the latter, and insulates them from each other. It is preferably the same elastomer as that from which the coil form 2 is made. Other materials are also possible, but they should have approximately the same properties as the material of the coil form 2.

We claim:

1. Optical-waveguide coil in a housing, characterized in that the optical-waveguide coil (1) is wound on a coil form (2) made of an elastomer of low hardness, that the coil unit so formed (1/2) is embedded in, and the free interior of the housing (3/5) is filled with, a sealing compound (6), and that the sealing compound (6) is the same as or similar to the elastomer of the coil form (2).

2. An optical-waveguide coil as claimed in claim 1, characterized in that the housing consists of a solid lower part (3) and a cover (5), the lower part (3) having and annular groove (4).

3. An optical-waveguide coil as claimed in claim 1, characterized in that the coil form (2) has spacers at its outside surfaces.

4. An optical-waveguide coil as claimed in claim 2, characterized in that the housing (3/5) is made of metal.

5. An optical-waveguide coil as claimed in claim 2, characterized in that the housing (3/5) is made of a plastic containing inorganic thermally conductive fillers.

6. A method of making an optical-waveguide coil of the type that is wound on an elastomeric coil form, said coil and coil form being imbedded in a space provided in a housing and surrounded by a sealing compound which is the same as or similar to the elastomer of the coil form, said method comprising the steps of:
   placing the coil form over a winding mandrel and simultaneously expanding said coil form;
   winding the optical waveguide onto the coil form under low tension;
   removing the coil form from the winding mandrel so that the coil form resumes its original unexpanded shape;
   placing the coil form and wound optical waveguide in the housing; and
   embedding the coil form and winding in a sealing compound while in a vacuum.

* * * * *